Patented Oct. 26, 1937

2,096,737

UNITED STATES PATENT OFFICE 2,096,737

STABILIZED CHLORINATED SOLVENTS AND METHOD OF STABILIZING SUCH SOLVENTS

Clarence F. Dinley, Detroit, Mich., assignor to James H. Bell, Philadelphia, Pa.

No Drawing. Application March 5, 1935, Serial No. 9,447

11 Claims. (Cl. 87—5)

My invention relates to volatile chlorinated solvents and their purification, stabilization, and use. Such solvents are exemplified by trichloromethane, tetrachloromethane, dichlorethane, tetrachlorethane, trichlorethylene, and tetrachlorethylene. An object of the invention is to prevent corrosion or other such action on metals exposed to such solvents,—even when the solvents are heated and vaporized, and are exposed to the air or otherwise in contact with moisture. Such corrosion may arise in the cleaning of metal parts with chlorinated solvents, and in the use of such substances in metallic apparatus,—for cleaning or for other purposes. The use of such solvents as cleaning and degreasing agents has been widely attempted, since they are well known as solvents for oil and other grease. This application is a divisional continuation in part of my copending application Serial No. 566,176, filed September 30, 1931, as to common subject matter.

In the cleaning processes just referred to, metallic or other objects to be cleaned are introduced into a vessel or apparatus containing the heated solvent and its vapor, and constantly or intermittently open (or partly so) to permit the easy introduction and withdrawal of the work. This is possible without excessive loss of solvent vapor because the latter is heavier than air, and because provisions are made to condense the solvent vapor and prevent its escape. Sometimes contact or treatment with the hot liquid solvent is mainly relied on to clean or degrease the object(s) or work; sometimes treatment with the solvent vapor; and sometimes both.

While chlorinated solvents have been found of great value for these and other purposes, their use has been attended with serious drawbacks. Metal articles cleaned with such solvents are subject to objectionable spotting, while metallic apparatus in which the solvents are used is subject to progressive corrosion, that greatly abbreviates its useful life. Also, dangerous fumes are given off, that injuriously affect workers and may even render the vicinity of the apparatus uninhabitable. However, I have discovered ways of obviating such drawbacks.

I have found, in the first place, that these drawbacks are not due to any action of the chlorinated solvents themselves, but to chlorine (present as impurity in the solvent) in available reactive forms, such as hydrochloric acid or other chlorine acids, and free chlorine, even. Commercial chlorinated solvents commonly contain such available chlorine, and may have an acidity that is of measurable magnitude. Moreover, exposure of the (hot) solvent to the atmosphere in the partly open apparatus results in decomposition yielding available chlorine and/or acid, by reaction of the solvent with the atmospheric moisture, and with water that finds its way into the apparatus.

I have further found that in practice such troubles can be overcome by preparing the solvent or carrying out the treatment with it in suitable ways—preferably both. One way of doing this is to carry out the treatment with the solvent in the presence of a reagent that will neutralize or eliminate the available acid and chlorine, such as an alkali or an alkaline metal or compound that is readily chlorinatable,—and preferably water-insoluble or nearly so. Water soluble alkalis have the general drawback that any excess alkali may prove as detrimental as the acid that is to be neutralized. Because of their cheapness, various forms of calcium carbonate are commercially preferable, such as broken or crushed limestone or marble. However, many other substances are known to chemists as having suitable properties, including alkaline earth and other metal oxides and carbonates, such as magnesium oxide or carbonate, cadmium oxide, zinc oxide or carbonate, etc.

While such substances as indicated above perform their function very well in the liquid solvent, their influence is not felt in the vapor of the solvent; and it is especially in the vapor phase that the solvent decomposes, and that acid and (free) available chlorine are formed. Best results are obtained, therefore, by carrying out the treatment in the presence of a reagent that is of such volatility as to vaporize with the solvent, and that will stabilize the solvent vapor or counteract the objectionable decomposition,— whether by being itself readily chlorinated, or by neutralizing deleterious products formed in the vapor, or by preventing the usual decomposition of the solvent (i. e., stabilization in a stricter sense). Whatever its action, the agent employed should, of course, be compatible with the undecomposed solvent, so as neither to react with it under the conditions of use, nor to be driven off or separate from the solvent. That it should not boil so much below the solvent as to be driven off by the heat is also implied in its compatibility with the solvent, as well as in the statement that it vaporizes with the solvent. This last statement also implies, of course, that the stabilizer volatilizes without being itself decomposed by the heat. A great many organic substances such as hereinafter indicated are known to chemists as having suitable properties.

Examples of the class that are effective, as I believe, by neutralizing the (chlorine) acid, as well as by undergoing chlorination, are the volatile organic bases such as amines, characterized by the NH$_2$ radical, and pyridine and the like, characterized by the nitrogen radical,—which in the case of pyridine is included in the ring. They are soluble in chlorinated solvents, and impart to the product an alkaline reaction when used in sufficient proportions, such as those hereinafter indicated. The alkaloids such as caffeine, quinine, etc., are in general not sufficiently volatile for the purposes of my composition as now claimed herein.

Examples of another class are camphor and turpentine, amongst the less costly essential oils, which besides being volatile and chlorinatable, prevent or obviate trouble from the usual decomposition of the solvent in the presence of moisture. They are generally soluble in trichlorethylene and other chlorinated solvents, and steam-distil.

As against their advantages of volatilizing readily and stabilizing solvents very effectively, the organic bases as a class are often characterized by exceedingly unpleasant odors. Pyridine, in particular, which is relatively inexpensive, has a very objectionable odor. Compensatively, the essential oil class of stabilizers have decided but inoffensive odors. They are more costly than pyridine, and not so readily volatilized,—although the water commonly present with chlorinated solvents assists somewhat in their volatilization. Besides masking offensive odors, the use of essential oils along with organic bases in stabilizing solvents obviates the metal tarnishing sometimes produced by organic bases alone,—such as hereinafter referred to in connection with pyridine. It is the class of stabilizers represented by the essential oils in general (and specially camphor and turpentine) that I aim to cover in this application,—including especially their use together with volatile organic base stabilizers, or even with less volatile or non-volatile alkaloids, or with both organic bases and alkaloids, as well as by themselves. I also aim to cover more specially the combined use of essential oils and the organic base type or class of stabilizers, consisting essentially of amines and basic cyclic organic compounds characterized by nitrogen in the ring,—of which latter the pyridines are prominent examples,—coacting as a stabilizer for the solvent. I do not, however, herein claim stabilization by alkaloids per se, which is covered by my copending application Serial No. 725,732, filed May 15, 1934. Nor do I herein claim stabilization by organic bases per se, or the generic invention involved in the use of volatile organic stabilizers in general for my purpose, since these are covered by my application Serial No. 566,176 filed September 30, 1931, whereof this application is a continuation in-part.

In so far as the essential oil or other stabilizing agents (whether volatile or not) are actually chlorinated by chlorine (acid) liberated by incipient decomposition of the solvent, or neutralize such acid, this removal of a product of decomposition seems one probable rationale of the stabilizing effect. This applies equally to chlorination of the solvent in the strict sense, involving insertion or substitution of chlorine in the stabilizer molecule, or its addition thereto, and to chlorination involving addition of chlorine acid (HCl) to the stabilizer molecule, to form a hydrochloride. Some essential oils are susceptible of both types of chlorination (e. g., turpentine); some only of the first type (e. g., camphor); and some, perhaps, only of the second type.

Irrespective of actual chlorination, however, it would seem that many of my stabilizers (and especially essential oils) have a more strictly inhibitory power as against the usual decomposition of the solvent vapor and/or the reaction of the resulting chlorine (acid) with metal. They do, at any rate, prevent corrosion of metal in contact with the hot solvent or its vapor, even when the latter is exposed to the atmosphere.

It would appear that the advantages of using essential oil and organic base or other stabilizers together are not limited to the masking of odors or the prevention of tarnishing, as by pyridine or the like. Insofar as the essential oil inhibits decomposition of the solvent, there is less chlorine (acid) to be taken care of by the organic base; and insofar as the essential oil inhibits corrosion of metal by such chlorine acid, it reinforces the stabilizing action of the organic base in protecting the metal. Similar observations apply to the use of essential oils with alkaloids, or of all three types of stabilizers together. This is somewhat analogous to the fact that certain drugs taken concurrently produce a multiplied effect rather than a merely cumulative one.

As the organic stabilizers are comparatively expensive, it may be desirable to use the much less expensive solid alkalis like marble or limestone in conjunction with them, to take care of (chlorine) acid or other forms of available chlorine existing or produced in the liquid solvent. For this purpose, several handfuls of broken marble or limestone may be put into the pools of liquid in the apparatus where objects are treated with solvent, and these deposits replenished from time to time, so as to assure an ample supply at all times; and the organic stabilizer may be added to the liquid solvent in the apparatus before it has been materially heated,—as soon as the marble or limestone has had a chance to free the solvent of its initial acid or the like. Instead, however, of treating and stabilizing the solvent in the apparatus where objects are treated therewith, it is preferable to do this beforehand.

In general, the proportion of the organic agent added to the solvent may be anywhere from about ¼ of 1% to about 1½% by weight. However, larger proportions may sometimes be used: e. g., ¼ to 5% of pyridine, which has no effect on steel; although in excess it will slightly tarnish highly polished brass. Such proportions of organic stabilizer suffice to maintain an admixture thereof with the heated chlorinated solvent not merely during one ordinary treatment of work with the solvent, but over an extended period of use of the solvent, involving many such treatments.

Such purified and stabilized chlorinated solvents are useful for many purposes besides the cleaning processes hereinbefore referred to, and will not cause corrosion or give off objectionable fumes as long as any of the stabilizing ingredient remains. In using such prepared solvent in the cleaning processes above indicated, its stability may be prolonged by the presence of marble or limestone in the apparatus, as explained above, and may be extended indefinitely by repeated timely additions of the stabilizing agent.

The boiling points of volatile aliphatic chlorinated solvents and of specific stabilizers hereinbefore mentioned are as follows:

| | |
|---|---|
| Trichloromethane | 61°C. |
| Tetrachloromethane | 77 |
| Dichlorethane | 84 |
| Trichlorethylene | 87 |
| Tetrachlorethylene | 121 |
| Tetrachlorethane | 146 |
| Pyridine | 115 |
| Turpentine | 159 |

Accordingly, I have limited certain of my claims to aliphatic (or other) chlorinated solvents boiling under substantially 150° C., together with suitably correlated stabilizers. To express more definite correlation of the stabilizer with the solvent, I have in certain claims referred to the boiling point of the stabilizer as sufficiently near that of the solvent to insure vaporization of the stabilizer concurrently with the boiling of the solvent in substantial proportions, under the influence of heat,—as contrasted with the minute proportions (less than $\tfrac{1}{10}$ of 1%) in which substances boiling at temperatures very much higher than the solvent (e. g., aniline as compared with trichlorethylene) would vaporize with the boiling solvent.

Having thus described my invention, I claim:

1. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and volatilizing, along with the organic chlorinated solvent that is exposed to the atmosphere or to moisture, stabilizing essential oil that is compatible with the moist chlorinated solvent, volatilizing with it without being decomposed by heat but not boiling off from it below the boiling point of said solvent; and treating the objects with the solvent thus stabilized, while maintaining admixture of volatilized essential oil with the chlorinated solvent vapor during the exposure of the solvent to the atmosphere or to moisture.

2. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and vaporizing, along with the organic chlorinated solvent that is exposed to the atmosphere or to moisture, stabilizing essential oil and organic base that are compatible with the moist chlorinated solvent, vaporizing with it without being decomposed by heat but not boiling off from it below the boiling point of said solvent; and treating the objects with the solvent thus stabilized, while maintaining admixture of vaporized essential oil and organic base with the chlorinated solvent vapor during the exposure of the solvent to the atmosphere or to moisture.

3. An improved process in accordance with claim 2 wherein the organic base is a volatile amine base characterized by the nitrogen radical.

4. An improved process in accordance with claim 2 wherein the organic base is a volatile basic cyclic organic compound characterized by nitrogen in the ring.

5. An improved process of treating greasy objects with hot volatile organic chlorinated grease solvents that decompose when exposed in the hot vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and vaporizing, along with the organic chlorinated solvent that is exposed to the atmosphere or to moisture, stabilizing essential oil that is compatible with said chlorinated solvent, vaporizing with it without being decomposed by heat but not boiling off from it below the boiling point of said solvent; and treating the objects with the solvent thus stabilized, while maintaining admixture of vaporized essential oil with the chlorinated solvent vapor during the exposure of the metal parts to the solvent and of the solvent to the atmosphere or to moisture.

6. An improved process of treating greasy objects with hot volatile organic chlorinated grease solvents that decompose when exposed in the hot vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and vaporizing, along with the organic chlorinated solvent that is exposed to the atmosphere or to moisture, stabilizing essential oil and a stabilizing organic base that imparts an alkaline reaction to the moist chlorinated solvent, both said essential oil and said organic base being chlorinatable and also compatible with said chlorinated solvent, vaporizing with it without being decomposed by heat but not boiling off from it below the boiling point of said solvent; and treating the objects with the solvent thus stabilized, while maintaining admixture of vaporized essential oil and organic base with the chlorinated solvent vapor during the exposure of the metal parts to the solvent and of the solvent to the atmosphere or to moisture.

7. An oil and grease solvent composition, stabilized and adapted for cleaning or grease solvent use while hot under atmospheric exposure or with moisture, and comprising volatile chlorinated hydrocarbon grease solvent boiling under substantially 150° C., in combination with compatible stabilizing essential oil and stabilizing organic base of the class consisting of amines and of basic cyclic organic compounds characterized by nitrogen in the ring, coacting as a stabilizer for the solvent, said essential oil and said organic base being volatile with the solvent in the stated range and boiling sufficiently near the boiling point of the solvent to insure vaporization of the aforesaid composite stabilizer concurrently with the boiling of the solvent in substantial proportion, the said composite stabilizer being present in sufficient proportion to stabilize the solvent against decomposition in the hot vapor state, and the said organic base in sufficient proportion to impart an alkaline reaction to the composition.

8. An oil and grease solvent composition, stabilized and adapted for cleaning or grease-solvent use while hot under atmospheric exposure or with moisture, and comprising volatile chlorinated aliphatic hydrocarbon grease solvent boiling under substantially 150° C., in combination with compatible stabilizing essential oil and stabilizing organic amine base, coacting as a stabilizer for the solvent, said essential oil and said organic base being volatile with the solvent in the stated range and boiling sufficiently near the boiling point of the solvent to insure vaporization of the aforesaid composite stabilizer concurrently with the boiling of the solvent in substantial proportion, the said composite stabilizer being present in sufficient proportion to stabilize the solvent against decomposition in the hot vapor state, and the said organic base in sufficient proportion to impart an alkaline reaction to the composition.

9. An oil and grease solvent composition, stabilized and adapted for cleaning or grease solvent use while hot under atmospheric exposure or with moisture, and comprising volatile chlorinated hydrocarbon grease solvent boiling under substantially 150° C., in combination with compatible stabilizing essential oil and stabilizing basic cyclic organic compound characterized by nitrogen in the ring, coacting as a stabilizer for the solvent, said basic cyclic organic compound boiling within the stated range and said essential oil being volatile with the solvent in said range, and both of them boiling sufficiently near the boiling point of the solvent to insure vaporization of the aforesaid composite stabilizer concurrently with the boiling of the solvent in substantial proportion, the said composite stabilizer being present in sufficient proportion to stabilize the solvent against decomposition in the hot vapor state, and the said basic cyclic organic compound in sufficient proportion to impart an alkaline reaction to the composition.

10. An oil and grease solvent composition, stabilized and adapted for cleaning or grease-solvent use while hot under atmospheric exposure or with moisture, and comprising volatile chlorinated hydrocarbon grease solvent boiling under substantially 150° C., in combination with compatible stabilizing essential oil and a compatible stabilizing pyridine, coacting as a stabilizer for the solvent, said essential oil and said pyridine beng volatile with the solvent in the stated range and boiling sufficiently near the boiling point of the solvent to insure vaporization of the aforesaid composite stabilizer concurrently with the boiling of the solvent in substantial proportion, the said composite stabilizer being present in sufficient proportion to stabilize the solvent against decomposition in the hot vapor state, and the said pyridine in sufficient proportion to impart an alkaline reaction to the composition.

11. An oil and grease solvent composition, stabilized and adapted for cleaning or grease-solvent use while hot under atmospheric exposure or with moisture, and comprising trichlorethylene in combination with compatible stabilizing essential oil and pyridine, coacting as a stabilizer for the trichlorethylene, said essential oil, as well as the pyridine, boiling sufficiently near the boiling point of the trichlorethylene to insure their vaporization concurrently with the boiling of the trichlorethylene, the said composite stabilizer being present in sufficient proportion to stabilize the trichlorethylene against decomposition in the hot vapor state, and the pyridine in sufficient proportion to impart an alkaline reaction to the composition.

CLARENCE F. DINLEY.